(12) United States Patent
Nakagawa et al.

(10) Patent No.: US 8,483,523 B2
(45) Date of Patent: Jul. 9, 2013

(54) OPTICAL WAVEGUIDE ELECTRO-OPTIC DEVICE AND PROCESS OF MANUFACTURING OPTICAL WAVEGUIDE ELECTRO-OPTIC DEVICE

(75) Inventors: Jun Nakagawa, Yokohama (JP); Shuichi Suzuki, Yokohama (JP); Atsushi Sakai, Yokohama (JP); Koichiro Nakamura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 243 days.

(21) Appl. No.: 12/872,290

(22) Filed: Aug. 31, 2010

(65) Prior Publication Data

US 2011/0064352 A1    Mar. 17, 2011

(30) Foreign Application Priority Data

Sep. 14, 2009 (JP) ................................. 2009-211481

(51) Int. Cl.
*G02B 6/10* (2006.01)
(52) U.S. Cl.
USPC ................................................. 385/8; 385/40
(58) Field of Classification Search
None
See application file for complete search history.

(56) References Cited

U.S. PATENT DOCUMENTS

| 6,002,515 A * | 12/1999 | Mizuuchi et al. ............. 359/326 |
| 6,782,166 B1 * | 8/2004 | Grote et al. ...................... 385/40 |
| 6,873,751 B2 * | 3/2005 | Nishizawa et al. ................ 385/8 |
| 2008/0075413 A1 * | 3/2008 | Jen et al. ......................... 385/145 |
| 2008/0118217 A1 * | 5/2008 | Bintz et al. ..................... 385/143 |

FOREIGN PATENT DOCUMENTS

| JP | 2007-212787 | 8/2007 |
| JP | 4335542 | 7/2009 |

* cited by examiner

*Primary Examiner* — Tina Wong
(74) *Attorney, Agent, or Firm* — Oblon, Spivak, McClelland, Maier & Neustadt, L.L.P.

(57) ABSTRACT

An optical waveguide electro-optic device including: a support substrate; an optical waveguide which has a core layer formed of a ferroelectric material, and is formed on an upper side of the support substrate; a lower electrode layer formed on a lower side of the core layer and which is adhered to the support substrate through an adhesion layer; an upper electrode layer formed on an upper side of the core layer; and an external electrode part, wherein the optical waveguide has an incidence plane from where light enters and an outgoing plane from where the light exits, the core layer has a polarization inversion region and a polarization non-inversion region, the upper electrode layer has a plane in such a shape that a width of the plane expands from a side of the incidence plane toward a side of the outgoing plane, to cover the polarization inversion region of the core layer, and the lower electrode layer is connected electrically to the external electrode part on the side of the incidence plane.

8 Claims, 5 Drawing Sheets

OPTICAL WAVEGUIDE ELECTRO-OPTIC DEVICE AND PROCESS OF MANUFACTURING OPTICAL WAVEGUIDE ELECTRO-OPTIC DEVICE

CROSS-REFERENCE TO THE RELATED APPLICATION

The entire contents of Japanese patent application No. JP 2009-211481, filed on Sep. 14, 2009, of which the convention priority is claimed in this application, are incorporated hereinto by reference.

BACKGROUND OF THE INVENTION

1. Field of the Invention

The present invention relates to an optical waveguide electro-optic device and a process of manufacturing the optical waveguide electro-optic device, and especially relates to an improved optical waveguide electro-optic device which is suitable for miniaturization and a manufacturing process thereof.

2. Description of the Related Art

Traditionally, as an electro-optic device having an electro-optical effect, an optical waveguide electro-optic device and a manufacturing process thereof are known. The optical waveguide electro-optic device is used for such as an intensity modulator used in optical communication, a Q switch element used for obtaining pulse behavior of laser oscillation, and an optical deflector for controlling a traveling direction of light.

Here, a phenomenon in which a refractive index of a material changes by applying an electric field to the material is called an electro-optical effect. When a refractive-index variation $\Delta n$ due to the electro-optical effect is a Pockels effect, which is a linear electro-optical effect, the following formula is given.

$$\Delta n \propto r_{ij} \times V/d \tag{1}$$

Here, $r_{ij}$ represents an electro-optic constant (a Pockels constant), V represents an applied voltage, and d represents an interval of electrodes applied with the voltage.

It is desirable that such an electro-optic device respond at a low voltage and in a wide frequency domain. Large refractive-index variation at a low voltage is necessary, to obtain response characteristics at a low voltage and in a wide frequency domain. It is known from the formula (1) that this requirement can be met by decreasing the electrode interval d to increase the electric field strength (V/d). Accompanying a decrease in the electrode interval, the electro-optic device is usually formed with an optical waveguide structure.

As a conventional typical optical waveguide electro-optic device, for example, one formed by impurity diffusion is known, in which titanium diffuses locally in a crystal of lithium niobate to raise the refractive index of only the diffused region, to form the optical waveguide structure. In this optical waveguide structure, an electrode is formed near an optical waveguide area formed by diffusion of the impurity to a surface of the crystal.

In addition, as a general optical waveguide electro-optic device, a structure is known in which an adhesion layer, a lower electrode layer, a lower clad layer, a core layer, an upper clad layer, and an upper electrode layer are laminated sequentially on a support substrate.

In this kind of optical waveguide electro-optic device, an optical waveguide structure is produced that joins an electro-optical material or a nonlinear material to the support substrate formed of a material different from the above-mentioned materials directly or adheres them through an adhesive, and then the electro-optical material or the nonlinear material is thinned by grinding, and the upper electrode layer and the lower electrode layer are formed by a film-forming method such as a sputtering method or a vacuum deposition method.

Like this, in this kind of optical waveguide electro-optic device, the support substrate is necessary; therefore, a device which extracts the lower electrode layer arranged between the core layer and the support substrate to the exterior is necessary.

JP 4335542 B proposes that, in a conventional optical waveguide electro-optic device, as a device which is configured to extract a lower electrode layer arranged between a core layer and a support substrate to the exterior, for example, an area of a lamination plane of the support substrate is formed to be bigger than that of the core layer, and an extraction electrode which extracts the lower electrode layer to the exterior is provided on the support substrate.

JP 4335542 B discloses an optical deflection element by which a larger deflection angle than previously achievable can be obtained and a process of manufacturing the optical deflection element, in the optical waveguide electro-optic device. However, in the optical waveguide electro-optic device according to JP 4335542 B, when producing the optical deflection element having the larger deflection angle, the electro-optic device increases in size since the area of the support substrate has to be formed larger than that of the core layer.

SUMMARY OF THE INVENTION

At least an object of the present invention is to provide an optical waveguide electro-optic device, in which an optical deflection element with a larger deflection angle than that of a conventional one can be achieved, without enlarging an area of a support substrate, and to provide a process of manufacturing the optical waveguide electro-optic device.

In light of the above-mentioned, the present invention proposes, for example, an optical waveguide electro-optic device including: a support substrate; an optical waveguide which has a core layer formed of a ferroelectric material, and is formed on an upper side of the support substrate; a lower electrode layer formed on a lower side of the core layer and which is adhered to the support substrate through an adhesion layer; an upper electrode layer formed on an upper side of the core layer; and an external electrode part, wherein the optical waveguide has an incidence plane from where light enters and an outgoing plane from where the light exits, the core layer has a polarization inversion region and a polarization non-inversion region, the upper electrode layer has a plane in such a shape that a width of the plane expands from a side of the incidence plane toward a side of the outgoing plane, to cover the polarization inversion region of the core layer, and the lower electrode layer is connected electrically to the external electrode part on the side of the incidence plane.

The present invention further proposes, for example, a process of manufacturing an optical waveguide electro-optic device which includes a support substrate and an optical waveguide having a core layer formed of a ferroelectric material and an upper clad layer and a lower clad layer, the process of manufacturing including: applying an electric field equal to or more than a coercive electric field value of an electro-optical material which constitutes the core layer to the core layer to form a polarization inversion region in the core layer; forming the lower clad layer on a lower surface of the core layer; forming a lower electrode layer on a lower surface of the lower clad layer; adhering the core layer provided with the lower electrode layer to the support substrate through an adhesion layer; forming the upper clad layer on a surface of the core layer opposite the lower surface on which the lower clad layer is formed; forming on an upper surface of the upper clad layer, an upper electrode layer in such a shape that a width expands from a side of an incidence plane of the optical waveguide toward a side of an outgoing plane of the optical waveguide, to cover the polarization inversion region of the core layer; and electrically connecting the lower electrode layer to an external electrode part which is formed at least on the side of the incidence plane of the optical waveguide, on the side of the incidence plane of the optical waveguide.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Example 1

Figure 1A:
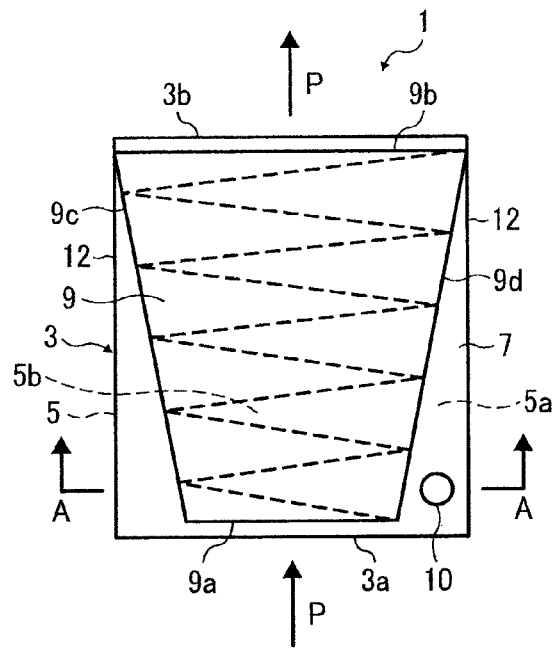
FIG. 1A is a top view of an optical waveguide electro-optic device of Example 1 according to the present invention.
Figure 1B:
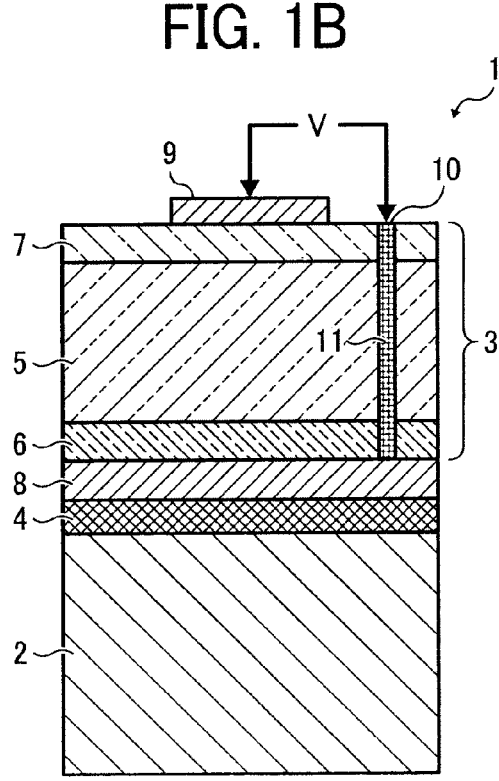
FIG. 1B is a cross-sectional view along the line A-A of the optical waveguide electro-optic device of Example 1 according to the present invention.
Figure 1C:
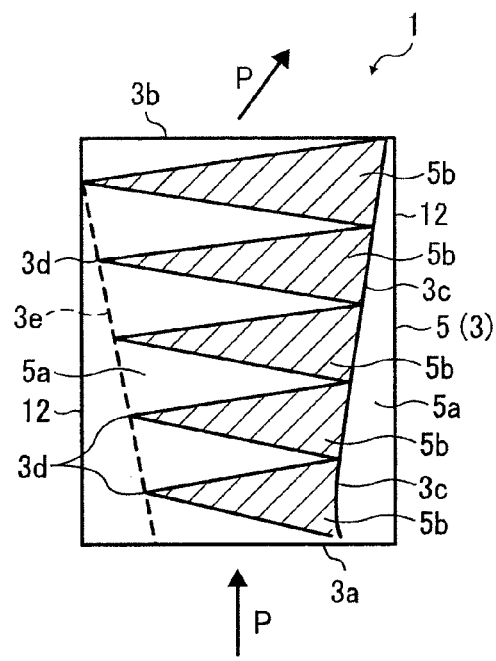
FIG. 1C is a plan view illustrating a polarization inversion region formed in a core layer of the optical waveguide electro-optic device according to the present invention illustrated in FIG. 1B.

FIGS. 1A to 1C are explanatory drawings of an optical waveguide electro-optic device of Example 1 according to the present invention. In FIGS. 1A to 1C, 1 represents an optical waveguide electro-optic device.

The optical waveguide electro-optic device 1 has a support substrate 2 and an optical waveguide 3. The optical waveguide 3 is formed on the support substrate 2 through an adhesion layer 4.

The optical waveguide 3 includes a core layer 5 formed of a ferroelectric material, a lower clad layer 6 located under the core layer 5, and an upper clad layer 7 located on an upper surface of the core layer 5. A lower electrode layer 8 is formed on a lower surface of the lower clad layer 6, and an upper electrode layer 9 is formed on an upper surface of the upper clad layer 7.

As illustrated in FIGS. 1A and 1C, the electro-optic device 1 is substantially cube-shaped. The optical waveguide 3 has a rectangle shape when viewed from a top side. The optical waveguide 3 has an incidence plane 3a from where light P enters, and an outgoing plane 3b from where the light P exits.

The core layer 5 is made of an electro-optical material, the refractive index of which changes by applying a voltage. The refractive index of the core layer 5 changes by applying a voltage between the lower electrode layer 8 and the upper electrode layer 9. Electro-optical materials such as lithium niobate (LiNbO3), lithium tantalate (LiTaO3), KTP (KTiOPO4), SBN and KTN are used for the core layer 5.

The core layer 5 has a polarization non-inversion region 5a and a polarization inversion region 5b, as illustrated in FIG. 1C. The upper electrode layer 9 has a plane in such a shape that the width of the plane expands from a side of the incidence plane 3a toward a side of the outgoing plane 3b, to cover the polarization inversion region 5b of the core layer 5.

The polarization inversion region 5b includes a prism region by which light entering the incidence plane 3a is deflected and is output from the outgoing plane 3b. The prism region has a plurality of prism region parts, and from the incidence plane 3a to the outgoing plane 3b, a height from a base 3c to a top 3d of each of the plurality of prism region parts increases gradually.

The polarization inversion region 5b is formed, for example, by a direct electrical field. Here, the direct electrical field is applied using a method that applies an electric field in a reverse direction to the polarization axes of an electro-optical material. A value of an applied electric field is a value equal to or more than an inherent coercive electric field value of an electro-optical material which constitutes the core layer 5.

The orientation of polarization reverses when an electric field equal to or more than the inherent coercive electric field value of the electro-optical material which constitutes the core layer 5 is applied to the core layer 5. Then, after covering the polarization non-inversion region 5a where the orientation of polarization is not inversed with an insulator, an electric field equal to or more than the coercive electric field value is applied to the core layer 5. As a result, in the core layer 5, the polarization non-inversion region 5a and the polarization inversion region 5b are formed.

In the present example, lithium niobate is used as an electro-optical material which constitutes the core layer 5, and after forming a photoresist film as an insulation film on a surface of the core layer 5 with a spin-coating process, a polarization non-inversion pattern corresponding to the polarization non-inversion region 5a is formed with a photolithographic process.

An electric field equal to or more than the inherent coercive electric field value of the electro-optical material which constitutes the core layer 5 is then applied, and a region corresponding to the polarization inversion region 5b is subjected to reverse polarization, and the polarization non-inversion region 5a and the polarization inversion region 5b are formed in the core layer 5.

Here, the thickness of a crystal of the lithium niobate is about 300 μm, the coercive electric field value is 20.5 kV/mm, and an applied voltage value is set to be 6.15 kV. Since variations of refractive indexes are reversed in the polarization non-inversion region 5a and the polarization inversion region 5b when a voltage V is applied to the core layer 5, a prism structure can be produced in the core layer 5.

Therefore, the light P entering the incidence plane 3a of the electro-optic device 1 and passing inside the core layer 5, is refracted at a boundary of the prism region parts, and exits the outgoing plane 3b, as illustrated in FIG. 1C. The light P that exits the outgoing plane 3b is deflected to a traveling direction different from that of the light P when entering the incidence plane 3a, in the prism region parts. In addition, as shown by the formula (1), the refractive index changes in response to an applied voltage V; therefore, a desired deflection angle can be obtained in response to the value of an applied voltage V, and the core layer 5 can be used as an optical deflector.

A plurality of prism region parts are provided, and since even each angle of deflection of the light P entering the incidence plane 3a, deflected by each of the plurality of prism region parts, is small, an angle of deflection of the light P that exits the outgoing plane 3b can be enlarged. In addition, twenty prism region parts are disposed in parallel, and a width of a first prism on the incidence plane side is set to be 1 mm, and a width of a twentieth prism on the outgoing plane side is set to be 1.6 mm.

In addition, a structure is employed such that from the side of the incidence plane 3a towards the side of the outgoing plane 3b, the height from a base 3c to a top 3d, of each of the plurality of prism region parts in the polarization inversion region 5b, increases gradually. This is because, with such a structure in which heights of the plurality of prism region parts increase gradually from the side of the incidence plane 3a to the side of the outgoing plane 3b, a larger angle of deflection can be obtained, compared with a structure in which a plurality of prism region parts having a constant height are arranged. This can be easily understood, considering Snell's law of geometric optics. In other words, the angle of deflection of the electro-optic device 1 is great, by such a structure in which, when the light P entering the incidence plane 3a is refracted by a certain prism region part and progresses to a following prism region part, in a refraction traveling direction of the light P the following prism region part locates.

The lower clad layer 6 and the lower electrode layer 8 are formed on an electro-optics material crystal as the core layer 5 in which the polarization non-inversion region 5a and the polarization inversion region 5b are formed, by a well-known method such as a sputtering method or a vacuum evaporation method.

A dielectric substance such as $SiO_2$, $Ta_2O_5$, $TiO_2$, $Si_3N_4$, $Al_2O_3$ and $HfO_2$ is used as a clad material which constitutes the lower clad layer 6. In addition, as an electrode material which constitutes the lower electrode layer 8, a metallic material such as Au, Pt, Ti, Al, Ni and Cr can be used, as well a transparent electrode such as ITO. The lower electrode layer 8 is formed over all a lower surface of the lower clad layer 6.

In the present example, $SiO_2$ is used as the clad material, and Ti is used as the electrode material. The lower electrode layer 8 of 200 nm in thickness is formed on the lower surface of the lower clad layer 6, after the lower clad layer 6 of 200 nm in thickness has been formed on a lower surface of the core layer 5, with the sputtering method.

The adhesion layer 4 is formed on a lower surface of the lower electrode layer 8 using an adhesive, after the lower electrode layer 8 has been formed, and the core layer 5 is adhered to the support substrate 2 through the lower electrode layer 8 and the lower clad layer 6. Afterwards, a thickness of the core layer 5 is thinned by grinding.

It is preferable that a material of which a thermal expansion coefficient is equal to that of the material used for the core layer 5 be used for the support substrate 2. If the thermal expansion coefficient of the material used for the support substrate 2 is different to the thermal expansion coefficient of the material used for the core layer 5, thermal expansion by temperature change after adhering will cause distortion by internal stress in the core layer 5, and cracks will generate in the core layer 5.

In the present example, a UV-curable resin adhesive is used as the adhesive, and a niobate lithium substrate is used as the support substrate 2. Afterwards, the core layer 5 is ground so that the thickness becomes within a range from 10 μm to 300 μM.

Since the coefficient of thermal expansion in the X axial direction of lithium niobate is 1.54×10-5/K, and that of SUS303 is 1.46×10-5/K, their coefficients of thermal expansion are nearly identical to each other. Therefore, it is also possible to use SUS303 for the support substrate 2. In addition, it is possible to join the lower electrode layer 8 and the support substrate 2 directly if a metallic material is used for the support substrate 2, instead of attaching the lower electrode layer 8 to the support substrate 2 with an adhesive.

The upper clad layer 7 is formed on an upper surface of the core layer 5 after the core layer 5 is ground, after that, the upper electrode layer 9 is formed on an upper surface of the upper clad layer 7. Methods of formation of the upper clad layer 7 and the upper electrode layer 9 are similar to those of the lower clad layer 6 and the lower electrode layer 8.

Figure 2:
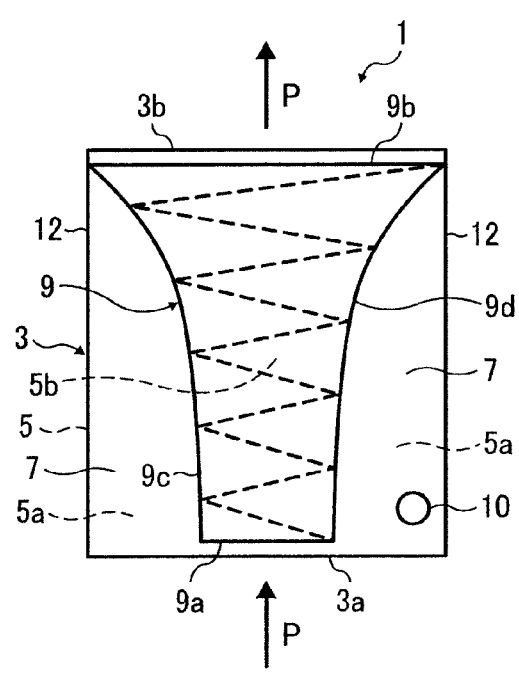
FIG. 2 is a top view of an optical waveguide electro-optic device having an upper electrode layer with a horn shape or a trumpet shape in which an incidence plane side is a short side and an outgoing plane side is a long side, according to an example of the present invention.

A geometric plane shape of the upper electrode layer 9 is a trapezoidal shape or a tapered shape, as illustrated for example in FIG. 1A, in which, on the side of the incidence plane 3a is a short side 9a, on the side of the outgoing plane 3b is a long side 9b, and a first lateral side 9c corresponds roughly to an envelope curve 3e connecting tops 3d of the plurality of prism region parts, and a second lateral side 9d corresponds roughly to a line obtained by connecting the bases 3c of the plurality of prism region parts. However, an area of the upper electrode layer 9 can be reduced further by forming in a horn shape or a trumpet shape, if the plurality of prism region parts is in a shape with great nonlinearity. FIG. 2 illustrates an upper electrode layer 9 in a horn shape or a trumpet shape in which, on a side of an incidence plane 3a is a short side 9a, and on a side of an outgoing plane 3b is a long side 9b.

Since to function as an optical deflector, it is preferable that an area of its functional range be as small as possible, and that, the upper electrode layer 9 be formed in the horn shape or the trumpet shape, without forming over all the core layer 5, which is different to the lower electrode layer 8. This is because the capacitance increases when an electrode area increases, and in a case where the electro-optic device 1 is used as an optical deflector, the capacitance and a driving operation frequency are in a trade-off relationship, and a high frequency operation at a low electric power becomes possible the smaller the capacitance. In addition, it is preferable that the upper electrode layer 9 correspond only to a prism region where a refractive index is changed.

The lower electrode layer 8 is connected electrically to an external electrode part 10 on the side of the incidence plane. The external electrode part 10 is formed in the polarization non-inversion region 5a on the side of the incidence plane, as illustrated in FIG. 1A and FIG. 1B. In the present example, the external electrode part 10 has a penetrating electrode part 11 which extends from the upper electrode layer 9 toward the lower electrode layer 8, penetrating through the upper clad layer 7, the core layer 5, and the lower clad layer 6, as illustrated in FIG. 1B.

The penetrating electrode part 11 is formed by a method explained hereinafter. First, in the polarization non-inversion region 5a on the side of the incidence plane, a through-hole is formed which penetrates through the upper clad layer 7, the core layer 5 and the lower clad layer 6, and reaches the lower electrode layer 8, and then an electrically conductive material is filled in the through-hole. Therefore, the lower electrode layer 8 can be extracted to the exterior without forming an area of the support substrate 2 larger than an area of the optical waveguide 3, and a compact optical waveguide electro-optic device 1 can be obtained.

In the present example, the upper clad layer 7 of 200 nm in thickness is formed on the upper surface of the core layer 5, using $SiO_2$ as the clad material. Afterwards, a through-hole of 100 μm in diameter and 10 μm in depth is formed near the short side 9a of the upper electrode layer 9 and a lateral face, by an excimer ablation method.

Afterwards, using Ti as the electrode material and the electrically conductive material, the upper electrode layer 9 in a trapezoidal shape in which a short side is 1 mm and a long side is 1.6 mm and a height is 20 mm, is formed on an upper surface of the upper clad layer 7, by the sputtering method. In addition, the electrically conductive material Ti is filled in the through-hole, and then the penetrating electrode part 11 is formed.

To avoid short circuit to the upper electrode layer 9, it is preferable to form the through-hole at a position separated from both the upper electrode layer 9 and the lateral face by about 100 μm. In addition, the through-hole can be formed by a dry etching method.

After the electro-optic device 1 has been formed, an operation of the electro-optic device 1 is confirmed. As a result, it is confirmed that a current flows and the electro-optic device 1 operates normally, and a short circuit with the surroundings is prevented from occurring.

In Example 1, the optical waveguide 3 has the core layer 5, the lower clad layer 6, and the upper clad layer 7. This is an example in which the lower clad layer 6 with a refractive index lower than that of the core layer 5 is provided on the lower surface of the core layer 5, and the upper clad layer 7 with a refractive index lower than that of the core layer 5 is provided on the upper surface of the core layer 5, in consideration of light loss and a propagating mode of waveguide light. It is possible for even no clad layer to be attached to both surfaces of the core layer 5 in the present invention.

Example 2

Figure 3A:
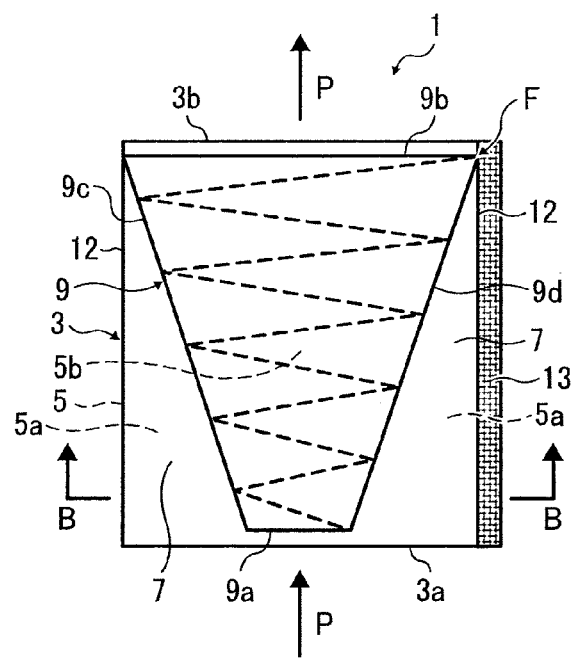
FIG. 3A is a top view of an optical waveguide electro-optic device of Example 2 according to the present invention.
Figure 3B:
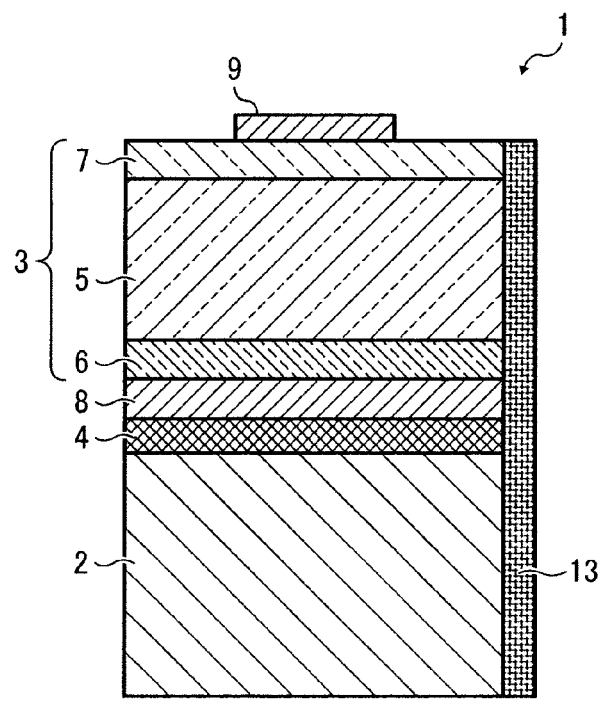
FIG. 3B is a cross-sectional view along the line B-B of the optical waveguide electro-optic device of Example 2 according to the present invention.

FIG. 3A and FIG. 3B are explanatory drawings of an optical waveguide electro-optic device of Example 2 according to the present invention, and FIG. 3A is a top view of the optical waveguide electro-optic device of Example 2 according to the present invention.

In the present example, an external electrode part 10 has a conductive film 13 which is formed on a lateral face 12 perpendicular to the incidence plane 3a or the outgoing plane 3b, and which comes into contact with the lower electrode layer 8. In FIG. 3A, the conductive film 13 is formed on the entire surface of the lateral face 12, and is connected electrically to the lower electrode layer 8 by contact.

The external electrode part 10 according to Example 2 is applicable to a case in which a difference between the long side 9b and the short side 9a of the upper electrode layer 9 is 100 μm or less so that it is difficult to form the through-hole shown in Example 1 in the polarization non-inversion region 5a. With this structure, the lower electrode layer 8 can be extracted to the exterior without forming an area of the support substrate 2 larger than an area of the optical waveguide 3, and a compact optical waveguide electro-optic device 1 can be obtained.

However, as illustrated in FIG. 3A and FIG. 3B, if the conductive film 13 is formed on the entire surface of the lateral face 12, a corner part of the upper electrode layer 9 on the side of the outgoing plane 3b comes into contact with a part of the conductive film 13 on the side of the outgoing plane 3b, as shown by an arrow F in FIG. 3A, and there is a possibility that the lower electrode layer 8 and the upper electrode layer 9 are short circuited.

Figure 4:
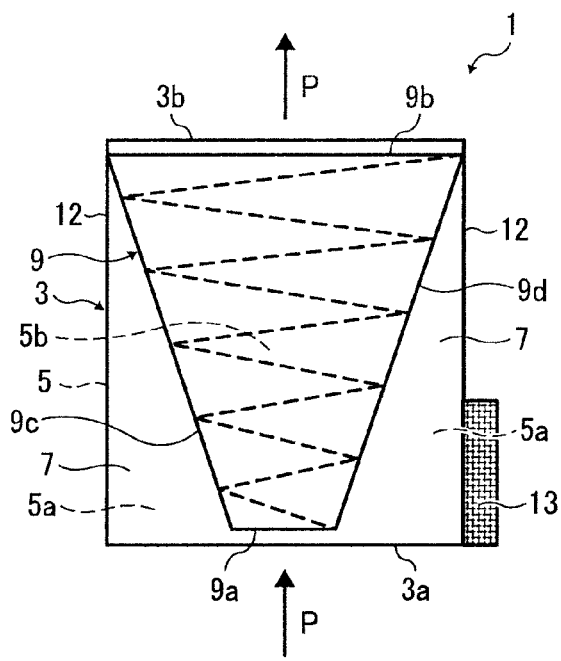
FIG. 4 is a top view of an optical waveguide electro-optic device in which a conductive film illustrated in FIG. 3A as an external electrode part is only formed on a lateral face of an incidence plane side, according to another example of the present invention.

Therefore, it is preferable that the conductive film 13 come into contact with the lower electrode layer 8 at the polarization non-inversion region 5a on the side of the incidence plane 3a. Therefore, the conductive film 13 is formed only at a part of the lateral face 12 on the side of the incidence plane 3a as illustrated in FIG. 4, or the conductive film 13 is formed on the entire surface of the incidence plane 3a as illustrated in FIG. 5.

Figure 5:
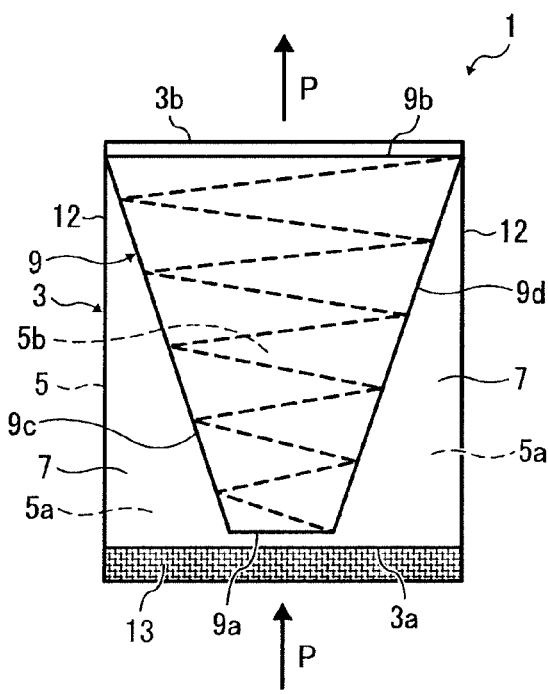
FIG. 5 is a top view of an optical waveguide electro-optic device in which a conductive film as an external electrode part is formed on an incidence plane, according to a further example of the present invention.

Especially, as illustrated in FIG. 5, when the conductive film 13 is formed on the surface of the incidence plane 3a, in a case where the electro-optic device 1 is used to propagate light P with a wavelength in the visible light range, it is preferable to use a transparent electrode material ITO as an electrode material of the conductive film 13. Even when it is difficult to form the conductive film 13 on the lateral face 12 accompanying modularization or packaging of the optical waveguide electro-optic device 1, in the case that the conductive film 13 is formed on the incidence plane 3a, the external electrode part 10 can be formed easily.

Example 3

Figure 6A:
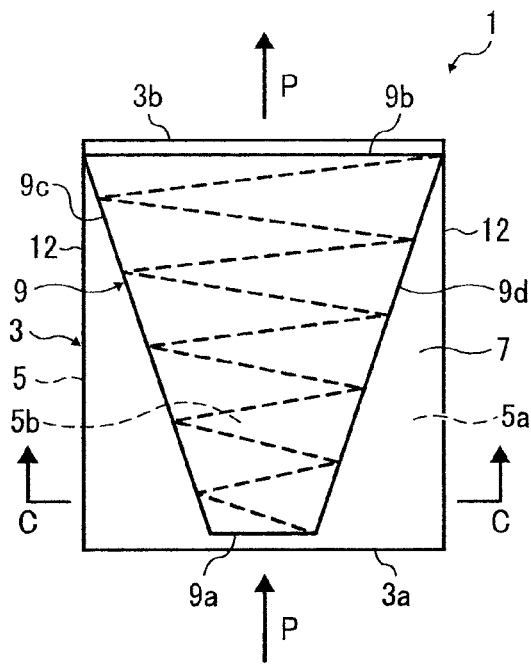
FIG. 6A is a top view of an optical waveguide electro-optic device of Example 3 according to the present invention.
Figure 6B:
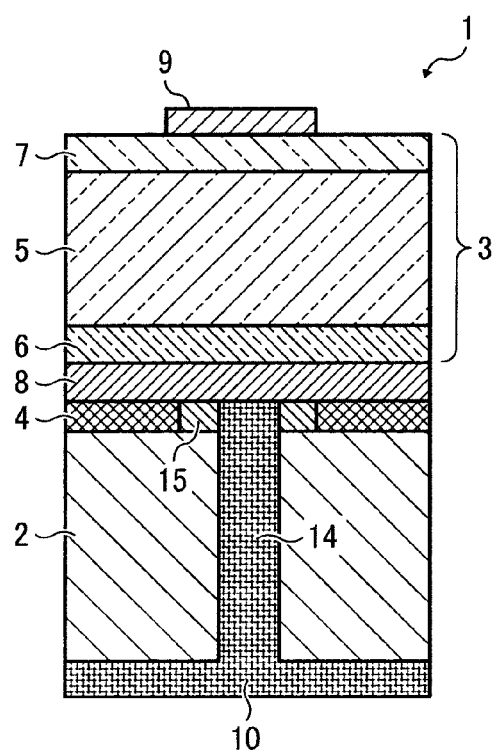
FIG. 6B is a cross-sectional view along the line C-C of the optical waveguide electro-optic device of Example 3 according to the present invention.

FIG. 6A and FIG. 6B are explanatory drawings of an optical waveguide electro-optic device of Example 3 according to the present invention, and FIG. 6A is a top view of the optical waveguide electro-optic device of Example 3 according to the present invention.

In the present example, an external electrode part 10 is formed under the support substrate 2, and is connected electrically to the lower electrode layer 8 by a penetrating electrode part 14 which penetrates through the support substrate 2 and the adhesion layer 4.

A block layer 15 is formed in the adhesion layer 4. The penetrating electrode part 14 penetrates through the block layer 15 and comes into contact with the lower electrode layer 8. Thus, the lower electrode layer 8 is extracted to a lower side of the support substrate 2 and is connected electrically to the external electrode part 10. Here, the block layer 15 plays a role in preventing an invasion of the adhesive to the penetrating electrode part 14.

Accompanying modularization or packaging of the optical waveguide electro-optic device 1, when the lower electrode layer 8 can not be extracted to the exterior from the upper clad layer 7, and has to be extracted to the exterior from the lower side of the support substrate 2, the structure according to Example 3 is useful.

In Example 3, using lithium niobate for the support substrate 2, a through-hole of 300 μm in diameter and 300 μm in depth is made by an excimer ablation method. In addition, the block layer 15, of which a cross-section is in a rectangular shape when viewed from the top, is formed in surroundings of the through-hole of the support substrate 2. As well as the rectangular shape, the block layer 15 can be formed with a cross-section in a cylindrical shape, or a triangular shape.

The block layer 15 is formed with a photolithographic process. After forming the lower clad layer 6 on the lower surface of the core layer 5 having the polarization inversion region 5b and the polarization non-inversion region 5a, the lower electrode layer 8 is formed on the lower surface of the lower clad layer 6 and then is adhered to the support substrate 2 by an adhesive. As a result, the adhesion layer 4 is formed between the support substrate 2 and the lower electrode layer 8.

Afterwards, a penetrating electrode part 14 is formed in the through-hole by a sputtering method, and the external electrode part 10 is formed over all the lower surface of the support substrate 2.

In the above-mentioned examples of the electro-optic device, the optical waveguide electro-optic device 1 includes the support substrate 2, and the optical waveguide 3 formed on the support substrate 2 through the adhesion layer 4. The optical waveguide 3 has the core layer 5 made of a ferroelectric material. The lower clad layer 6 is formed on the lower surface of the core layer 5, and the upper clad layer 7 is formed on the upper surface of the core layer 5. The lower electrode layer 8 is formed on the lower surface of the lower clad layer 6, and the upper electrode layer 9 is formed on the upper surface of the upper clad layer 7. The optical waveguide 3 has the incidence plane 3a from where the light P enters and the outgoing plane 3b from where the light P exits. The core layer 5 has the polarization inversion region 5b and the polarization non-inversion region 5a. The upper electrode layer 9 has the plane in such a shape that the width of the plane expands from the side of the incidence plane 3a towards the side of the outgoing plane 3b, to cover the polarization inversion region 5b of the core layer 5. The lower electrode layer 8 is connected electrically to the external electrode part 10 on the side of the incidence plane 3a.

The external electrode part 10 has the penetrating electrode part 11, which is formed in the polarization non-inversion region 5a on the side of the incidence plane 3a, and extends from the side of the upper electrode layer 9 towards the lower electrode layer 8 penetrating through the core layer 5, as illustrated in FIGS. 1A to 1C and FIG. 2. The upper electrode layer 9 is formed in a trapezoidal shape, taper shape, or horn shape.

It is possible for the external electrode part 10 to have the penetrating electrode part 14 formed under the support substrate 2 and extend toward the lower electrode layer 8 penetrating through the support substrate 2 and the adhesion layer 4, as illustrated in FIG. 6B.

In addition, it is possible for the external electrode part 10 to have the conductive film 13 formed on the entire surface of the lateral face 12 perpendicular to the incidence plane 3a or the outgoing plane 3b and comes into contact with the lower electrode layer 8, as illustrated in FIG. 3A and FIG. 3B.

As illustrated in FIG. 4, the conductive film 13 can be connected electrically to the lower electrode layer 8 at the part of the lateral face 12 on the side of the incidence plane 3a.

The polarization inversion region 5b includes the prism region which deflects the light entering the incidence plane 3a and outputs the light from the outgoing plane 3b, as illustrated in FIGS. 1A, 1C, 2, 3A, 4, 5 and 6A. The prism region has a plurality of prism region parts, and a height from the base 3c to the top 3d of each of the plurality of prism region parts increases gradually, from the incidence plane 3a toward the outgoing plane 3b.

The block layer 15 is formed in the adhesion layer 4, and it is possible that the penetrating electrode part 14 be configured to penetrate through the block layer 15 and to be connected electrically to the lower electrode layer 8.

In the above-mentioned examples of the processes of manufacturing the electro-optic device, for example, after applying the electric field equal to or more than the coercive electric field value of the electro-optical material which constitutes the core layer 5 to the core layer 5 and forming the polarization inversion region 5b, the lower clad layer 6 is formed on the lower surface of the core layer 5, and then the lower electrode layer 8 is formed on the lower surface of the lower clad layer 6, and the core layer 5 is adhered to the support substrate 2 through the adhesion layer 4. And, on the surface of the core layer 5 opposite the surface where the lower clad layer 6 is formed, the upper clad layer 7 is formed, after that, on the upper surface of the upper clad layer 7, the upper electrode layer 9 in such a shape that the width expands from the side of the incidence plane 3a towards the side of the outgoing plane 3b is formed, to cover the polarization inversion region 5b of the core layer 5. And then, the lower electrode layer 8 is connected electrically to the external electrode part 10 on the side of the incidence plane 3a.

In the present invention, it is possible to form the upper and lower electrode layers directly on the upper and lower surfaces of the core layer 5, respectively, without forming the upper and lower clad layers.

In the case that the external electrode part 10 has the penetrating electrode part 11 which is formed in the polarization non-inversion region 5a on the side of the incidence plane 3a, and extends from the upper electrode layer 9 toward the lower electrode layer 8, penetrating through the core layer 5, the penetrating electrode part 11 is formed by, after forming a through-hole in the core layer 5 with the ablation which uses an excimer laser or dry etching method, filling the electrically conductive material in the through-hole.

In the case that the external electrode part 10 has the penetrating electrode part 14 which is formed under the support substrate 2 and extends toward the lower electrode layer 8 penetrating through the support substrate 2 and the adhesion layer 4, the penetrating electrode part 14 is formed by, after forming a through-hole in the support substrate 2 with the ablation which uses an excimer laser or dry etching method, filling the electrically conductive material in the through-hole.

In the case that the external electrode part 10 has the conductive film 13, the conductive film 13 is formed on the lateral face 12 perpendicular to the incidence plane 3a or the outgoing side 3b and comes into contact with the lower electrode layer 8. The conductive film 13 is formed to be connected electrically with the lower electrode layer 8 at the part of the lateral face 12 on the side of the incidence plane 3a.

In the case that the external electrode part 10 is formed under the support substrate 2, after forming the block layer 15 on the support substrate 2, the through-hole is formed in the support substrate 2. And then the support substrate 2 is adhered to the lower electrode layer 8 through the adhesion layer 4, and the external electrode part 10 is connected electrically to the lower electrode layer 8 through the support substrate 2 and the block layer 15, by the penetrating electrode part 14 formed in the through-hole.

According to an aspect of the present invention, an optical waveguide electro-optic device having an optical deflection element with a deflection angle greater than that of a conventional one, without enlarging an area of a support substrate, can be obtained. In addition, a high frequency operation at a low voltage can be achieved accompanying miniaturization of the electro-optic device.

In addition, according to another aspect of the present invention, a process of manufacturing the above-mentioned optical waveguide electro-optic device can be provided.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. An optical waveguide electro-optic device, comprising:
a support substrate;
an optical waveguide which has a core layer formed of a ferroelectric material, and is formed on an upper side of the support substrate;
a lower electrode layer formed on a lower side of the core layer and which is adhered to the support substrate through an adhesion layer;
an upper electrode layer formed on an upper side of the core layer; and
an external electrode part,
wherein
the optical waveguide has an incidence plane from where light enters and an outgoing plane from where the light exits,
the core layer has a plurality of polarization inversion regions and a plurality of polarization non-inversion regions, the polarization inversion regions and the polarization non-inversion regions being arranged alternately from the incidence plane toward the outgoing plane,
the upper electrode layer has a shape such that an area of each of the plurality of polarization inversion regions expands as going to the outgoing plane, and the lower electrode layer is connected electrically to the external electrode part on a side of the incidence plane.

2. An optical waveguide electro-optic device according to claim 1, wherein a lower clad layer is formed on a lower surface of the core layer, an upper clad layer is formed on an upper surface of the core layer, the lower electrode layer is formed on a lower surface of the lower clad layer, and the upper electrode layer is formed on an upper surface of the upper clad layer.

3. An optical waveguide electro-optic device according to claim 1, wherein
the external electrode part is formed in a polarization non-inversion region on the side of the incidence plane, and has a penetrating electrode part which extends from an upper electrode layer side toward the lower electrode layer penetrating through the core layer, and
the upper electrode layer is formed in a trapezoidal shape, or a tapered shape, or a horn shape.

4. An optical waveguide electro-optic device according to claim 1, wherein
the external electrode part is formed under the support substrate, and has a penetrating electrode part which extends toward the lower electrode layer penetrating through the support substrate and the adhesion layer, and
the upper electrode layer is formed in a trapezoidal shape, or a tapered shape, or a horn shape.

5. An optical waveguide electro-optic device according to claim 1, wherein
the external electrode part has a conductive film which is formed on a lateral face perpendicular to the incidence plane or the outgoing plane and comes into contact with the lower electrode layer, and
the upper electrode layer is formed in a trapezoidal shape, or a tapered shape, or a horn shape.

6. An optical waveguide electro-optic device according to claim 5, wherein the conductive film is formed on the entire surface of the lateral face, or on a part of the lateral face on the side of the incidence plane.

7. An optical waveguide electro-optic device according to claim 1, wherein the plurality of polarization inversion regions include a prism region which deflects the light entering the incidence plane and outputs the light from the outgoing plane, the prism region having a plurality of prism region parts, and a height from a base to a top of each of the plurality of prism region parts increasing gradually, from the incidence plane toward the outgoing plane.

8. An optical waveguide electro-optic device according to claim 4, wherein a block layer is formed in the adhesion layer, and the penetrating electrode part is connected to the lower electrode layer penetrating through the block layer.

* * * * *